United States Patent Office 3,575,728
Patented Apr. 20, 1971

3,575,728
ELECTRIC CELLS USING UREA MONOSULFONIC ACID AS ELECTROLYTE
Hiroshi Ito, 31-7-814 1-chome Hatagaya Shibuya-ku, Tokyo-to, Japan
No Drawing. Filed Dec. 18, 1968, Ser. No. 784,948
Int. Cl. H01m 11/00
U.S. Cl. 136—154         8 Claims

ABSTRACT OF THE DISCLOSURE

The invention provides an electric cell in which urea monosulfonic acid is used as the elctrolyte. The other parts of the cell, excepting the electrolyte, involve the following three types in combination of the elements; the first one comprising carbon as a positive electrode, zinc as a negative electrode and manganese dioxide or air as a depolarizer; the second one comprising iron or nickel as a positive electrode, zinc as a negative electrode and air as a depolarizer; and the third one comprising copper as a positive electrode, zinc as a negative electrode and cupric oxide as a depolarizer.

DETAILED DESCRIPTION OF THE INVENTION

The present invention relates to an electric cell using urea monosulfonic acid as the electrolyte. More particularly, it is characterized in the provision of such a cell that can be used directly as a primary cell after being assembled, and also be used as a secondary cell when being charged after having been discharged owing to a reversible chemical reaction accompanying the charge-discharge behavior in the cell.

The urea monosulfonic acid to be used as the electrolyte in the present invention is a known compound as disclosed in Kirk-Othmer's "Encyclopedia of Chemical Technology" vol. 14 (1955), page 460, having the molecular formula of $NH_2CONHSO_3H$ which has usually been synthesized by the addition reaction between urea and sulfur trioxide. This conventional process, however, is not suitable for large scale industrial production because it needs large-sized and expensive reactors both for generating sulfur trioxide and for reacting urea with sulfur trioxide, and the yield attained thereby is not satisfactory.

The most suitable process for producing the urea monosulfonic acid is now found to involve a reaction in which urea and sulfuric acid are dehydratively condensed according to the following reaction scheme:

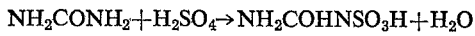

$$NH_2CONH_2 + H_2SO_4 \rightarrow NH_2COHNSO_3H + H_2O$$

The process whereby a maximum yield is obtainable according to the above reaction is carried out in a following manner.

Urea is added to concentrated sulfuric acid in an equimolar proportion and dissolved therein uniformly at a temperature ranging from normal temperature up to about 120° C. at which no significant reaction yet takes place. The resulting solution is then brought into a temperature of about 130° C. at which the reaction starts uniformly. This reaction starting temperature generally depends upon the mixing ratio of sulfuric acid to urea and the concentration of the sulfuric acid used. After reaching the reaction temperature, the solution boils while giving off moisture. Thereafter, the heating means is removed and the reaction further continued autogenously by the exothermic reaction heat. As the reaction proceeds, the solution becomes white and cloudy and finally changes into a white porous solid mass to end the reaction. The white solid mass is then recrystallized from water and filtered to separate urea monosulfonic acid as the desired compound, the yield of which is approximately 7.0%.

The urea monosulfonic acid readily dissolves in water to form its aqeous solution which neither dissolves carbon and metals such as zinc, iron, nickel, copper, etc., nor directly decomposes metal oxides such as cupric oxide and manganese dioxide. The aqueous solution of urea monosulfonic acid has a high specific electroconductivity, so that it can be used as an electrolyte in a cell. When using carbon as the positive electrode, zinc as the negative electrode, manganese dioxide as the depolarizer in combination with the urea monosulfonic acid as the electrolyte, I have now found that the electromotive force and the capacity of the resultant cell are the same as that of a similar conventional cell in which ammonium chloride is used as the electrolyte, carbon as the positive electrode, zinc as the negative electrode and manganese dioxide as the depolarizer. Surprisingly, I have also found that the cell of the present invention can be equally used after it has discharged, by charging. In addition to this, the inventor has now found that the aqueous solution of the urea monosulfonic acid is also used as the electrolyte in other types of cells, including a type comprising carbon as the positive electrode, zinc as the negative electrode and the air contacting with activated carbon as the depolarizer; another type comprising porous nickel or iron as the positive electrode, zinc as the negative electrode and directly acting air as the depolarizer; and still another type comprising copper as the positive electrode, zinc as the negative electrode and cupric oxide as the depolarizer, to give cells each having a high electromotive force and being not only utilizable directly as a primary cell but also utilizable as a secondary cell by charging after having been discharged where both electrodes, depolarizer and electrolyte can be simultaneously regenerated.

The invention is, therefore, based on the surprising discovery that the urea monosulfonic acid has outstandingly desirable and unique properties for use as the electrolyte of the above-mentioned cells.

An object of the present invention is to provide a new use of the urea monosulfonic acid.

Another object of the present invention is to provide a means for using a primary cell for a prolonged period of time with repeated chargings and dischargings.

Still another object of the present invention is to provide an electric cell having much better performances than conventional primary cells at reduced costs.

A further object of the present invention is to provide, at reduced cost, a secondary cell which is lighter in the weight and higher in performances than the conventional lead type storage batteries and alkaline type storage batteries.

A still further object of the present invention is to provide a means for producing a secondary cell which is powerful but smaller than a conventional one.

Still another object of the present invention is to provide a cell which is light-weight and capable of being easily handled.

The cell of the present invention is mainly directed to the use of urea monosulfonic acid as the electrolyte, but other parts of the cell are particularly related to the following constructions:

(1) A positive electrode made of carbon, a negative electrode of zinc, and a depolarizer of manganese dioxide.

(2) A positive electrode made of carbon negative electrode of zinc and a depolarizer of air.

(3) A positive electrode of nickel, negative electrode of zinc and a depolarizer of air.

(4) A positive electrode of iron, negative electrode of zinc and a depolarizer of air.

(5) A positive electrode of copper, negative electrode of zinc and a depolarizer of cupric oxide.

Besides the main and essential parts of the cell as shown above, following techniques known in the art can be suitably combined therewith so as to form various modifications of the cell of the present invention:

A type of cell, where carbon is used as the positive electrode and air as depolarizer, in which activated carbon or a composition containing the same is attached to the positive electrode with which air is in contact.

A type of cell, where nickel or iron is used as the positive electrode and air is used as the depolarizer, in which the positive electrode is made porous and is in contact with air.

A type of cell, where carbon is used as the positive electrode and manganese dioxide is used as the depolarizer (the oxidation and reduction reactions accompanying the charging and discharge are smoothly effected therein), in which carbon powder and an electrolyte are mixed to impart electroconductivity.

The electrolyte of the cell of the invention, i.e., urea monosulfonic acid operates essentially as its aqueous solution. However, it may be used, when the use of aqueous solution itself is inconvenient, in the form obtained after being aborbed in powder, granules, spongy materials, papers and the like non-conductive substances; or it may be used as a pasty mixture with starch, poly (vinyl alcohol), clay, etc., accomplishing the same effect.

It is also possible to apply prior and conventional techniques including an alternating arrangement of the plurality of positive electrode plates and negative electrode plates thereby increasing facing areas as well as enlarging the capacity of a single cell.

The chemical reactions in the cells of the present invention are given as follows:

In a type of cell in which carbon is used as the positive electrode, zinc is used as the negative electrode and manganese dioxide is used as the depolarizer, the reaction upon discharge is thought to proceed as follows;

At the negative electrode:

$$Zn + 2NH_2CONHSO_3^- \rightarrow Zn(NH_2CONHSO_3)_2 + 2\ominus$$

At the positive electrode:

$$2\ominus + 2NH_2CONHSO_3H + 2MnO_2 \rightarrow 2NH_2CONHSO_2^- + H_2O + Mn_2O_3$$

In total:

$$Zn + 2NH_2CONHSO_3H + 2MnO_2 \rightarrow Zn(NH_2CONHSO_3)_2 + H_2O + Mn_2O_3$$

At the charging stage of the cell, the reaction is supposed to proceed in reverse, i.e., in the direction opposite to that shown by the arrows, and a smooth reaction is observed upon the actual operation.

In a type of the cell wherein copper is used as the positive electrode, zinc as the negative electrode and cupric oxide as the depolarizer, the reaction involves oxidation-reduction of the cupric oxide upon charging and discharge in a manner similar to the case of the above-described manganese oxide, i.e., $2MnO_2 \rightarrow Mn_2O_3$ (reduction by discharge) and $Mn_2O_3 \rightarrow 2MnO_3$ (oxidation by charge), and a smooth reaction is also observed in the actual operation.

In a type of cell wherein copper is used as the positive electrode, zinc is used as the negative electrode and activated carbon in contact with air is used as the depolarizer, the reaction at the discharge is considered to proceed as follows:

At the negative electrode:

$$Zn + 2NH_2CONHSO_3^- \rightarrow Zn(NH_2CONHSO_3)_2 + 2\ominus$$

At the positive electrode:

$$2\ominus + 2HN_2CONHSO_3H + \tfrac{1}{2}O_2 \rightarrow 2NH_2CONHSO_3^- + H_2O$$

In total:

$$Zn + 2HN_2CONHSO_3H + \tfrac{1}{2}O_2 \rightarrow Zn(NH_2CONHSO_3) + H_2O$$

In the charging stage, the reaction is supposed to take place in reverse, i.e., in the direction opposite to that shown by the arrow, and the smooth reaction is actually observed by the experiment.

In another type of the cell wherein a porous positive electrode made of nickel and iron is used as the positive electrode, zinc is used as the negative electrode and air in contact with the positive electrode as the depolarizer (Types 3 and 4), the reaction is supposed to involve the release and absorption of oxygen in the air at the positive electrode upon charge and discharge, in a mechanism similar to the case of the above-described activated carbon, and a smooth reaction is also observable in the actual operation.

The invention is illustrated in further details by the following examples:

EXAMPLE 1

A cell using carbon as the positive electrode, zinc as the negative electrode and manganese dioxide as the depolarizer (Type 1)

In the bottom of a 50 cc. glass beaker, a carbon disk of 3 mm. in thickness and 30 mm. in diameter was placed as the positive electrode. A pasty mixture obtained by mixing 20 g. powdery manganese dioxide and 7 g. carbon powder kneaded with a small proportion of added 5% aqueous solution of urea monosulfonic acid was put and pressed tightly upon the carbon disk to form the depolarizer. Then, 25 cc. of 30% aqueous urea monosulfonic acid solution was poured into the beaker as the electrolyte. A zinc disk of 1 mm. in thickness and 3 cm. in diameter was submerged in the electrolyte liquid at the distance of 1 cm. above the upper surface of the depolarizer layer.

The cell so constructed had a terminal voltage of 1.5 v. and the change in the voltage measured during the continuous discharge at 20 ma. was as follows:

| Lapse time | Terminal voltage, volts | Lapse time, minutes | Terminal voltage, volts |
| --- | --- | --- | --- |
| 20 minutes | 1.3 | 80 | 1.2 |
| 40 minutes | 1.25 | 100 | 1.15 |
| 60 minutes | 1.25 | 120 | 1.1 |

The cell was then continuously charged at 2.0 v. for the period of 150 minutes, and continuously discharged again at 20 ma. The change in the terminal voltage in this test was measured as follows:

| Lapse time | Terminal voltage, volts | Lapse time, minutes | Terminal voltage, volts |
| --- | --- | --- | --- |
| Initial | 1.8 | 60 | 1.2 |
| 5 minutes | 1.4 | 80 | 1.2 |
| 20 minutes | 1.3 | 100 | 1.18 |
| 40 minutes | 1.2 | 120 | 1.1 |

The cell was recharged thereafter at 2.0 v. for the period of 150 minutes, and again discharged continuously at 20 ma. The same discharging performance was obtained as that of the preceding discharge, proving that the cell can be repeatedly charged and discharged for a long period.

The same experiment was carried out as to a similar cell in which a 30% aqueous solution of ammonium chloride was used in place of the urea monosulfonic acid as the electrolyte. The terminal voltage of this cell, when it was first constructed, showed the same performance as that of the cell of this invention, but subsequent charging after the first discharge was not possible due to the decomposition of the ammonium chloride.

EXAMPLE 2

A cell using carbon as the positive electrode, zinc as the negative electrode and air as the depolarizer (Type 2 cell)

In the bottom of a 50 cc. glass beaker, a zinc disk of 1 mm. in thickness and 3 cm. in diameter was placed as the negative electrode. Upon this disk 30 cc. of a 30% aqueous solution of urea monosulfonic acid was poured and a net support made of a nonelectroconductive material was placed in the liquid horizontally. Then, 25 cc. in apparent volume of activated carbon grains with the particle size of 6 mesh was put on the net support, and onto this was placed a carbon disk of 3 mm. in thickness and 3 cm. in diameter in tight contact to form the positive electrode. The cell so constructed had an initial terminal voltage of 1.4 v. the change of which during continuous discharge at 20 ma. was measured as follows:

| Lapse time | Terminal voltage, volts | Lapse time, minutes | Terminal voltage, volts |
| --- | --- | --- | --- |
| 20 minutes | 1.25 | 80 | 1.17 |
| 40 minutes | 1.20 | 100 | 1.1 |
| 60 minutes | 1.20 | | |

The cell was thereafter continuously charged at 2.0 v. for the period of 120 mins., and continuously discharged again at 20 ma. with the following performance:

| Lapse time | Terminal voltage, volts | Lapse time, minutes | Terminal voltage, volts |
| --- | --- | --- | --- |
| Initial | 1.6 | 60 | 1.18 |
| 5 minutes | 1.35 | 80 | 1.15 |
| 20 minutes | 1.2 | 90 | 1.1 |
| 40 minutes | 1.18 | | |

A similar result was obtained upon discharge at 20 ma. after it had been recharged at 2.0 v. for the period of 120 minutes demonstrating the possibility of repeated charges and discharges for a long period.

The same construction of the cell was applied to another sample cell except that a 30% aqueous solution of ammonium chloride was used as the electrolyte in place of the urea monosulfonic acid. However, the result of the test was the same as in the case of Example 1.

EXAMPLE 3

An electric cell of the present invention in which the positive electrode is nickel, the negative electrode is zinc and the depolarizer is air (Type 3)

A zinc cylinder of 4 cm. in external diameter, 3 cm. in length and 1 mm. in thickness was put vertically in a 50 cc. glass beaker to form the negative electrode, and 45 cc. of a 30% aqueous solution of urea monosulfonic acid was poured thereon.

A bottomed cylinder of 2 mm. in thickness, 1.5 cm. in external diameter and 5 cm. in length, compression-molded from nickel powder, was put and soaked in the solution at the center of the beaker to form the positive electrode. Air was blown inside the cylindrical nickel electrode at the rate of about 1.5 cc. per minute to thereby bubble uniformly into the solution through the pores of the nickel positive electrode.

The cell so constructed had a terminal voltage of 1.35 v. and the change in the voltage during the course of continuous discharge at 20 ma. was measured as follows:

| Lapse time | Terminal voltage, volts | Lapse time, minutes | Terminal voltage, volts |
| --- | --- | --- | --- |
| 1 minute | 1.4 | 80 | 1.3 |
| 20 minutes | 1.4 | 100 | 1.3 |
| 40 minutes | 1.4 | 120 | 1.2 |
| 60 minutes | 1.35 | | |

The cell was then charged at 2.0 v. for the period of 120 mins., followed by continuous discharge at 20 ma. to give following performance:

| Lapse time | Terminal voltage, volts | Lapse time, minutes | Terminal voltage, volts |
| --- | --- | --- | --- |
| Initial | 1.5 | 80 | 1.3 |
| 1 minute | 1.4 | 100 | 1.25 |
| 20 minutes | 1.4 | 120 | 1.2 |
| 40 minutes | 1.35 | | |
| 60 minutes | 1.35 | | |

From the result of the above test, it is understood that this type of the cell can also be used satisfactorily for repeated charge and discharge.

A similar result was obtained by carrying out the same experiment using iron as the material of the positive electrode.

EXAMPLE 4

A cell of the present invention using nickel as the positive electrode, zinc as the negative electrode and cupric oxide as the depolarizer (Type 5 cell)

In the bottom of a 50 cc. beaker, there was placed (as the positive electrode) a copper disk of 1 mm. in thickness and 3 cm. in diameter. A pasty mixture obtained by mixing 25 g. of copper oxide dust with a small amount of 15% aqueous solution of urea monosulfonic acid was pressed in a tight contact with the copper disk to form the depolarizer. Then, 25 cc. of 30% aqueous solution of urea monosulfonic acid was poured in the beaker, and a zinc disk of 1 mm. in thickness and 3 cm. in diameter was submerged in the electrolyte solution at a distance of 1 cm. above the upper surface of the copper-cupric oxide disk to form the negative electrode.

The cell so constructed had a terminal voltage of 1.1 v., the change of which during the continuous discharge at 20 ma. was measured as follows:

| Lapse time | Terminal voltage, volts | Lapse time, minutes | Terminal voltage, volts |
| --- | --- | --- | --- |
| 20 minutes | 1.05 | 80 | 1.0 |
| 40 minutes | 1.05 | 100 | 0.95 |
| 60 minutes | 1.0 | | |

The cell thus discharged was charged at 1.5 v. for the period of 100 minutes, and discharged again with the following performance:

| Lapse time | Terminal voltage, volts | Lapse time, minutes | Terminal voltage, volts |
| --- | --- | --- | --- |
| Initial | 1.1 | 60 | 1.05 |
| 20 minutes | 1.05 | 80 | 1.0 |
| 40 minutes | 1.05 | 100 | 1.0 |

As having been shown by the foregoing examples, every cell using urea monosulfonic acid as the electrolyte can be used, immediately after it has been assembled, as a primary cell, and it also operates as a secondary cell by charging for reuse.

Many changes and modifications cane be made in the above description, and it is to be understood that the invention is not limited to the illustrative embodiments shown therein except as defined within the scope of the claim.

What is claimed is:

1. An electric battery cell comprising a positive electrode of carbon, a depolarizer of manganese dioxide, a negative electrode of zinc and an electrolyte consisting essentially of urea monosulfonic acid.

2. An electric battery cell compirsing a positive electrode selected from the group consisting of nickel and iron, a negative electrode of zinc, a depolarizer of cupric oxide and an electrolyte consisting essentially of urea monosulfonic acid.

3. An electric battery cell as claimed in claim 2 wherein the positive electrode is iron.

4. An electric battery cell comprising a positive electrode of copper, a negative electrode of zinc, a depolarizer selected from the group consisting of cupric oxide and activated carbon in contact with air, and an electrolyte consisting essentially of urea monosulfonic acid.

5. An electric battery cell as claimed in claim 2 wherein the positive electrode is nickel.

6. An electric battery cell as claimed in claim 4 wherein the depolarizer is cupric oxide.

7. An electric battery cell as claimed in claim 4 wherein the depolarizer is activated carbon in contact with air.

8. An air-depolarized electric battery cell comprising a positive electrode selected from the group consisting of carbon, nickel and iron, a negative electrode of zinc and an electrolyte consisting essentially of urea monosulfonic acid.

References Cited
UNITED STATES PATENTS

| | | | |
|---|---|---|---|
| 1,906,784 | 5/1933 | Aden | 136—154 |
| 2,441,896 | 5/1948 | Moir | 136—154 |
| 2,597,116 | 5/1952 | Marsal et al. | 136—136 |
| 2,810,006 | 10/1957 | Ruben | 136—6 |
| 2,857,295 | 10/1958 | Brown | 136—154 |

WINSTON A. DOUGLAS, Primary Examiner

A. SKAPARS, Assistant Examiner

U.S. Cl. X.R.

136—6